United States Patent [19]

Mars

[11] 3,888,338
[45] June 10, 1975

[54] ELECTRONIC INDEXING SYSTEM
[75] Inventor: William T. Mars, Cuyahoga Falls, Ohio
[73] Assignee: McNeil Corporation, Akron, Ohio
[22] Filed: Oct. 3, 1973
[21] Appl. No.: 402,998

[52] U.S. Cl................ 192/142; 74/813 C; 318/470; 318/480
[51] Int. Cl............................................ F16d 13/22
[58] Field of Search.................. 192/142, 143, 144; 74/813 C; 318/470, 480

[56] References Cited
UNITED STATES PATENTS

| | | | |
|---|---|---|---|
| 3,040,609 | 6/1962 | Bowman | 318/470 |
| 3,213,715 | 10/1965 | Arenson | 192/142 R |
| 3,549,975 | 12/1970 | Ferris | 318/480 |
| 3,572,175 | 3/1971 | Deprez | 74/821 |
| 3,604,546 | 9/1971 | Widlis | 192/142 R |

Primary Examiner—Samuel Scott
Assistant Examiner—Randall Heald
Attorney, Agent, or Firm—Hamilton, Renner & Kenner

[57] ABSTRACT

Disclosed is a method and apparatus for linearly moving a machine element, such as a cutting blade, an accurate predetermined distance upon intermittent operation of a motor. The amount of travel of an indicator driven by the motor is sensed by a control system which automatically activates a motor brake which stops the motor at a preselected setting after a certain degree of overtravel. The control system senses and accounts for the amount of overtravel so that each subsequent operation of the motor moves the machine element the preselected distance even if the stopping characteristics of the brake should vary due to wear or the like.

10 Claims, 2 Drawing Figures

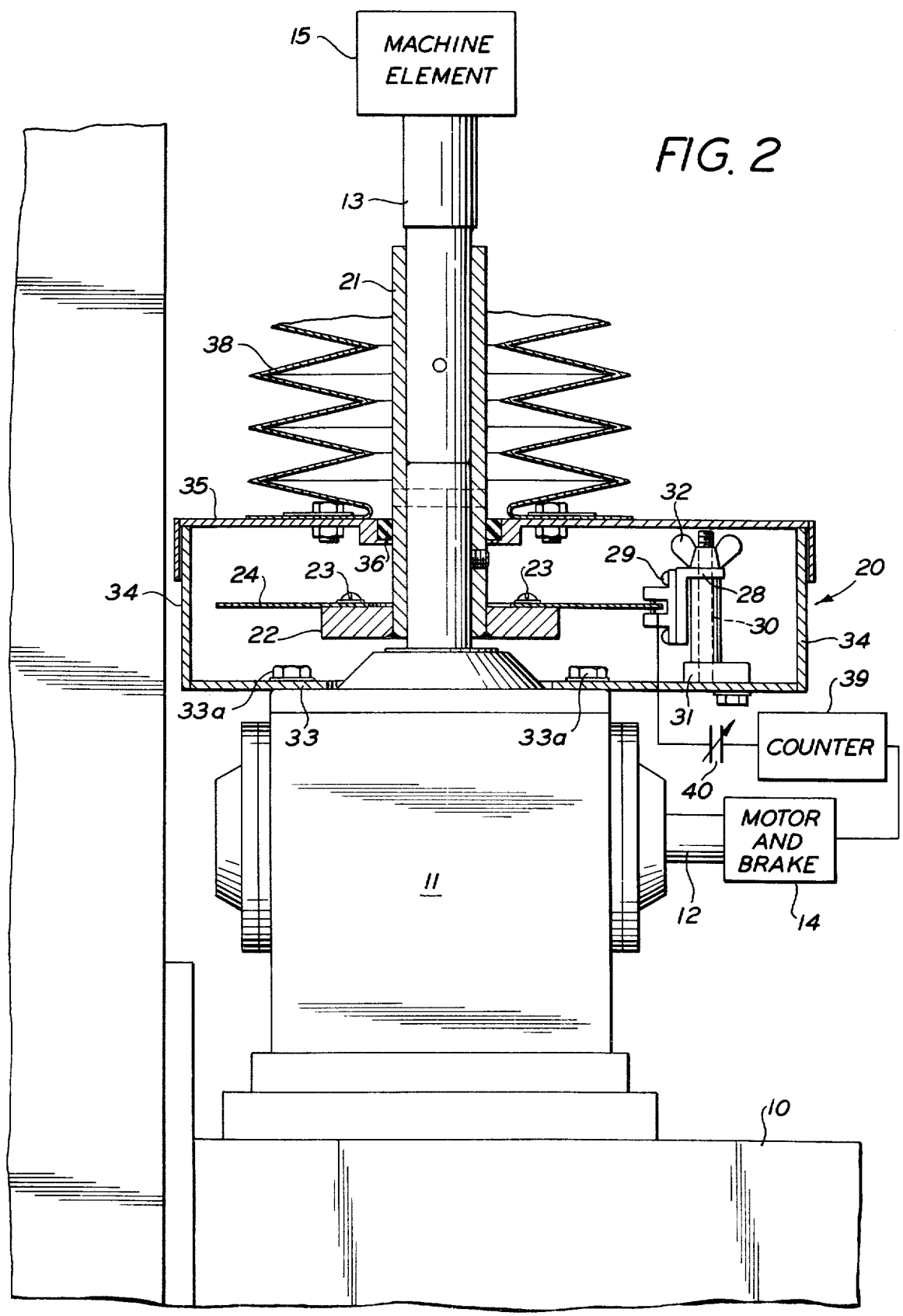

ELECTRONIC INDEXING SYSTEM

BACKGROUND OF THE INVENTION

This invention relates to a system for indexing machine elements. More specifically, this invention relates to an electronic system for indexing machine elements such as knives, blades or the like. Many industries utilize machines with movable machine elements wherein the control of the precise amount of movement of the machine element is critical. Indexing apparatus which repeatedly move such machine elements at intermittent intervals are well-known, being commonly used in cutting machinery wherein precise repeated blade movement is required.

The most popular types of indexing devices are presently generally mechanical in nature, such as that shown in U.S. Pat. No. 3,465,863. These devices, while capable of satisfactory operation, do have particular drawbacks. For example, these devices do not automatically compensate for component wear, such as the wearing of the brakes used to intermittently stop the driving motors. Thus, when such elements do wear, the indexing device must be re-calibrated resulting in significant labor and down time of the machine.

In addition, most prior art devices sacrifice speed and accuracy for cost and do not permit facile assembly or quick setting features. Thus, no single prior art device combines the qualities of speed, accuracy, ease of assembly, ease of setting change, and ability to compensate for varying motor overtravel due to brake wear or other factors at a cost which is not prohibitive.

SUMMARY OF THE INVENTION

It is thus a primary object of the present invention to provide a method and apparatus which continually compensates for changes in overtravel of a motor in a system for indexing a machine element without requiring re-calibration.

It is another object of the present invention to provide a method and apparatus, as above, which is a fast, accurate, compact, economical and silent operation system for indexing a machine element.

It is a further object of the present invention to provide a method and apparatus for indexing a machine element, as above, which features ease of assembly, ease of maintenance and ease in setting the precise movement desired of the machine element.

In general, the apparatus for controlling the movement of a machine element disclosed includes an indicator device which is driven by the motor that moves the machine element. A sensing device scans the indicator, reads the amount of movement of the machine element and activates a motor brake when a predetermined movement has been reached. The sensing device is continually programmed to account for the overtravel of the motor after the brake is applied such that any change in the overtravel is taken into account and such that the machine element is moved the same distance on successive actuations of the motor.

According to the method of the present invention, at the outset of the operation of the device, the desired machine travel is set into a counter of the sensing device and the apparatus is activated. The sensing device reads the indicator until the desired amount of linear movement of the machine element is reached, that is, until the actual count in the counter has matched the preselected count. At that time the brake is activated, the counter is instantly reset and the motor stops after a certain degree of overtravel which is now programmed into the counter. On the next and each successive operation, the sensing device will actuate the brake earlier in time by an amount equal to the overtravel of the previous run. Should the overtravel change on any run, that change will be reflected in the next successive operation.

BRIEF DESCRIPTION OF THE DRAWINGS

FIG. 2 is a sectional view taken substantially along line 2—2 of FIG. 1 and showing some of the environment and electronic portions of the present invention in block form.

DESCRIPTION OF THE PREFERRED EMBODIMENT

Figure 1:
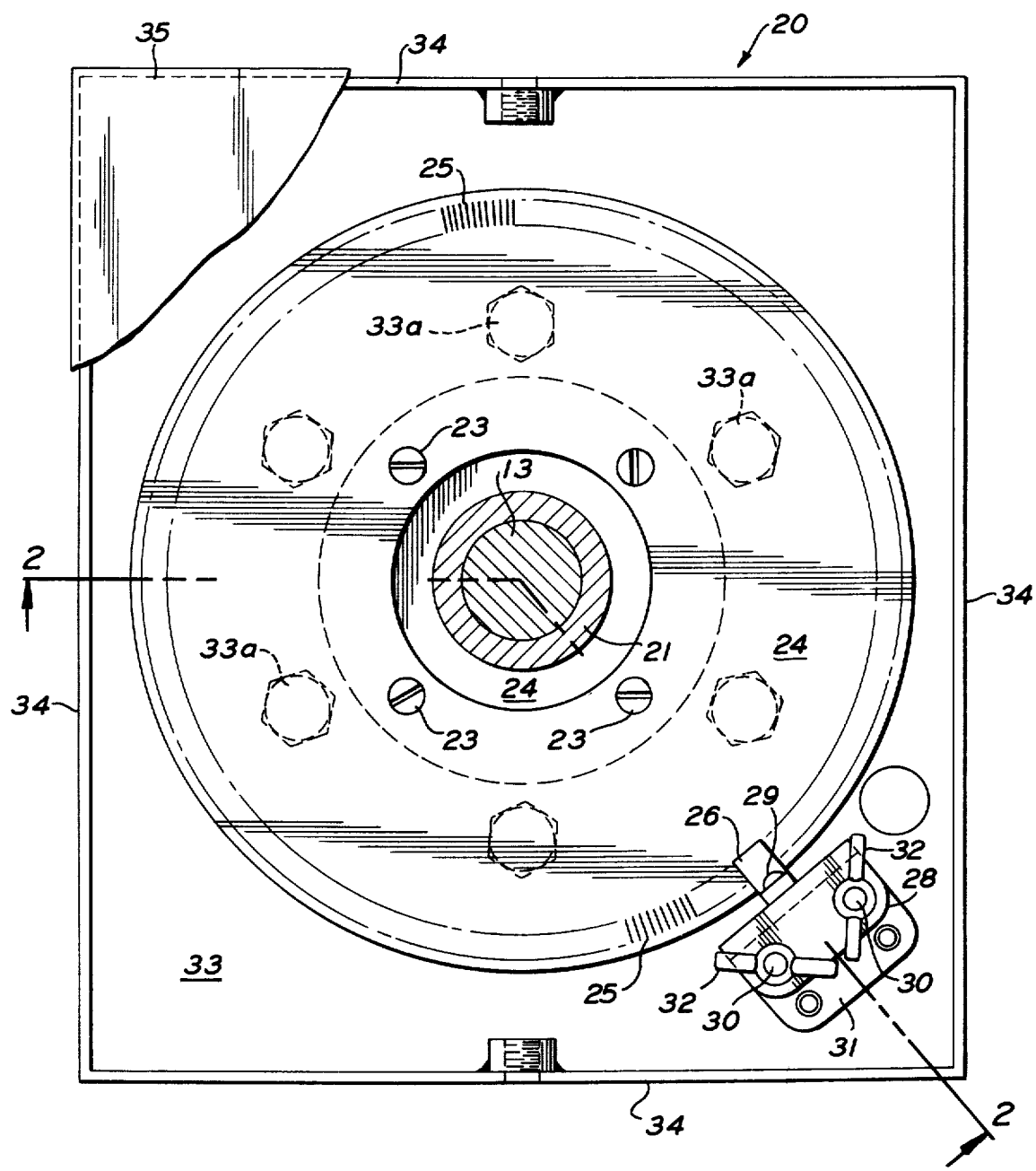
FIG. 1 is a partially sectioned, partially broken away top plan view of an indexing system according to the concept of the present invention.

Referring to the drawings and particularly FIG. 2 thereof, the apparatus according to present invention is shown as being used with a machine shown somewhat schematically as having a base 10 which carries a gear box 11 to convert the rotation of a drive shaft 12 to rotation of a screw shaft 13. Shaft 12 is driven by a reversible motor 14 which includes a conventional mechanical brake. Screw shaft 13 carries, near the top thereof, a machine element 15 which, upon activation of motor 14, is indexed, that is, linearly raised or lowered, to perform a work operation.

As will hereinafter become evident, the indexing system of the present invention can be used with a wide variety machines. The type of machine schematically shown herein could be an endless band knife foam cutting apparatus, the details of which are shown in U.S. Pat. No. 3,263,537. Thus, in this particular instance, the machine element is an endless band saw or band knife which is successively lowered to cut a workpiece on a work table (not shown).

The system for indexing the machine element 15 is indicated generally by the numeral 20 in FIG. 2. The lower unthreaded portion of screw shaft 13 is provided with a collar 21 to which is welded an annular support flange 22. Fixed to flange 22, as by screws 23, is an annular indicator plate or disc 24 which, as shown in FIG. 1, is circumferentially notched on both sides of the periphery thereof, as at 25, in increments such that the rotation of disc 24 and amount equivalent to one notch preferably represents one one-thousandth of an inch of linear movement of the machine element 15.

The periphery of disc 24 revolves through the jaws of a sensor 26 which is a conventional electronic device having a light emitting diode and phototransistor such as a Model H13B1 Photon Coupled Interrupter Module manufactured and sold by General Electric. Sensor 26 is fixed to a bracket 28, as by screws 29, which is adjustably mounted on threaded posts 30 extending upwardly from a bracket 31 and held in position by wing nuts 32. Thus, the position of the disc 24 with respect to the sensor 26 can be precisely located.

Bracket 31 is supported on a plate 33 fixed to the top of gear box 11 by bolts 33a. Welded to plate 33 are side enclosure plates 34 which support a cover plate 35. Plates 33, 34 and 35 thus enclose the disc 24, sensor 26 and related elements to maintain the same free of dust or other foreign material. A seal 36 can be provided between cover plate 35 and collar 21. In addition, a bellows seal 38 maintains screw shaft 13 free of dirt and the like.

The rotation of shaft 13 with its resultant movement of machine element 15 is thus monitored by sensor 26. As each incremental notch passes between the jaws of sensor 26, the light from the diode is interrupted and a signal proportional to shaft rotation as well as the linear movement of machine element 15 is fed to and recorded by a counter 39. Counter 39 can be a conventional electronic item such as a Series 7306 Electronic Predetermining Counter manufactured and sold by Automatic Timing and Controls, Inc., King of Prussia, Pennsylvania. Counter 39 is capable of being set to the desired amount of linear movement of machine element 15. Then, when motor 14 drives shaft 13, counter 39 operates with sensor 26 to sense and record the movement of disc 24 by counting the increments thereon. When the counter 39 reaches the preselected desired value for machine element movement, it immediately resets itself to zero instantly without losing any counts and also sends a signal to motor and brake 14 to stop the motor. In the event that manual operation is desired, a switch 40 is provided so that the system can be operated without the control of counter 39.

Of course, as is the instance with a mechanical brake, the motor will not stop instantly but rather there will be a degree of overtravel thereof. In order to account for this overtravel, the system 20 may be operated in the following fashion. Whenever the power is initially turned on as, for example, for a new day's operation, the system is put through a dry run to enter the overtravel into the counter. Assume, for example, that the machine element 15 is intended to move 250 thousandths or a quarter of an inch. That setting is manually entered into counter 39 and the motor 14 activated to index the machine element 15 one time. When the counter reaches the 250 preset count, sensor 26 having sensed 250 notches 25, it instantly resets itself to zero and signals the motor to stop. Then the counter begins to count the overtravel which may, for example, be twelve thousandths. When screw 13 ceases to rotate, the overtravel count remains and is stored in the counter 39 and the system is ready to operate.

During the first and each succeeding operation of the indexing system in the above-described example, the counter 39 will count from 12 to 250 at which time the motor will be braked and drift the additional twelve thousandths to index the machine element the desired 250 thousandths. In the event that wear of the mechanical brake or other changes in conditions would cause the overtravel to vary, the new overtravel would be automatically programmed into the counter with only one index cycle being in error. Every cycle thereafter would index the machine element according to the changed conditions with no re-calibration of the indexing device being necessary.

It should thus be evident that a system constructed and operated according to the concept of the present invention will provide accurate continual indexing of a machine element and otherwise substantially improve the indexing art.

I claim.

1. Apparatus for moving a machine element a preselected distance, the machine element being operated by a motor which is successively activated and thereafter stopped by a braking device, comprising indicator means driven by the motor and indicating the amount of movement of the machine element, electronic means having a preselected setting therein corresponding to the preselected distance of movement of the machine element, said electronic means reading said indicator means and activating the braking device to stop the motor after the preselected setting has been reached, the motor moving the machine element an overtravel distance between the time of the activation of the brake and the stopping of the motor, said electronic means accounting for the overtravel distance by effectively deducting the overtravel distance of the previous activation from the preselected setting so that the machine element is moved the preselected distance on the next successive activation of the motor.

2. Apparatus according to claim 1 wherein said indicator means includes a disc having means thereon corresponding to the movement of the machine element.

3. Apparatus according to claim 2 wherein the machine element is driven linearly by a rotatable screw shaft and said disc is mounted on said screw shaft.

4. Apparatus according to claim 3 wherein said means on said disc includes circumferentially placed notches, said electronic means reading and counting said notches as said disc rotates with said screw shaft.

5. Apparatus according to claim 1 wherein said electronic means includes a sensing device to read said indicator means and a counter to record the readings of said sensing device.

6. Apparatus according to claim 5 wherein the preselected setting is set into said counter.

7. Apparatus according to claim 5 wherein the machine element is driven linearly by a rotatable screw shaft and said indicator means includes a disc mounted on said screw shaft and has means thereon corresponding to the linear movement of the machine element, said sensing device reading said means corresponding to the linear movement of the machine element.

8. Apparatus according to claim 7 wherein said means corresponding to the linear movement of the machine element are notches placed near the periphery of said disc and said sensing device is adjustably mounted to read said notches.

9. A method of indexing to a preselected distance a machine element which is intermittently driven by a motor, the motor being stopped by a brake, the machine element moving an overtravel distance from the time the brake is activated until the time the motor stops; comprising the steps of, selecting the preselected distance; activating the motor to index the machine element the preselected distance; thereupon activating the brake to stop the motor; recording the overtravel distance of the machine element; and thereafter continuously indexing the machine element by intermittently activating the motor until said preselected distance less the overtravel distance is reached, and activating the brake to stop the motor.

10. A method according to claim 9 wherein the step of continuously indexing the machine element includes the step of continuously recording the overtravel distance so that the motor is activated until the preselected distance less the continuously recorded overtravel distance is reached.

* * * * *